United States Patent [19]

Nanyoshi et al.

[11] Patent Number: 4,987,770
[45] Date of Patent: Jan. 29, 1991

[54] COMBUSTIONING CONDITION MONITORING SYSTEM FOR INTERNAL COMBUSTION ENGINE

[75] Inventors: Yasutoshi Nanyoshi, Hyogo; Toshio Matsumura, Kanagawa, both of Japan

[73] Assignee: Nissan Motor Company, Limited, Yokohama, Japan

[21] Appl. No.: 385,868

[22] Filed: Jul. 27, 1989

[30] Foreign Application Priority Data

Jul. 27, 1988 [JP] Japan .................................. 63-189320

[51] Int. Cl.$^5$ ........................................... G01M 15/00
[52] U.S. Cl. .................................................. 73/115
[58] Field of Search ...................... 73/115, 116, 117.2, 73/117.3; 364/558

[56] References Cited

U.S. PATENT DOCUMENTS

| 4,525,781 | 6/1985 | Konomi et al. ........................ 73/115 |
| 4,562,728 | 1/1986 | Timmerman ......................... 73/116 |
| 4,606,224 | 8/1986 | Tedeschi et al. .................... 73/117.3 |
| 4,706,196 | 11/1987 | Muramatsu et al. ............... 73/117.3 |

Primary Examiner—Robert Raevis
Attorney, Agent, or Firm—Foley & Lardner, Schwartz, Jeffery, Schwaab, Mack, Blumenthal & Evans

[57] ABSTRACT

An engine combustioning condition monitoring system monitors crankshaft angular position for detecting an engine cylinder in combustion cycle. The system derives variation of velocity of a crankshaft revolution on the basis of the monitored crankshaft angular positions and derives a combustioning coefficient for each engine cylinder. A value representative of the variation of the crankshaft revolution velocity is modified by the combustioning coefficient for deriving internal pressure in each engine cylinder. Discrimination of the engine combustioning conditon is made on the basis of the engine cylinder internal pressure.

10 Claims, 5 Drawing Sheets

COMBUSTIONING CONDITION MONITORING SYSTEM FOR INTERNAL COMBUSTION ENGINE

BACKGROUND OF THE INVENTION

1. Field of the Invention

The present invention relates generally to a system for monitoring the combustioning condition of an internal combustion engine of an automotive vehicle. More specifically, the invention relates to a combustioning condition monitoring system for a multi-cylinder internal combustion engine.

2. Description of the Background Art

In the recent years, there has been developed various engine combustioning condition control systems for maintaining optimum engine combustioning condition for achieving high fuel efficiency and drivability. In order to monitor the engine combustioning condition, a combustioning gas pressure in an engine combustion chamber, which pressure may be hereafter referred to as cylinder pressure, has been monitored. For example, a technology for detecting the engine combustioning condition has been disclosed in Japanese Utility Model First (unexamined) Publication (Jikkai) Showa 62-24037. This publication proposes the technology monitoring of the engine combustioning condition by means of a pressure sensor formed in a form of a washer to be mounted onto the engine cylinder block with a spark ignition plug as a washer therefor. Such a pressure sensor monitors the internal pressure in the combustion chamber for producing a charge corresponding to the combustioning condition in the associated engine cylinder.

Such prior proposed technology is costly because it requires separate pressure sensors for the respective engine cylinders. Furthermore, as can be aware of, since the internal pressure in the engine cylinder during low engine load condition, such as engine idling condition, high accuracy in monitoring the internal pressure of the engine cylinder cannot be expected. Furthermore, since engine knocking tends to be caused in the vicinity of the top dead center in piston compression stroke. When the engine knocking is caused, the output of the pressure sensor may be influenced by the knocking vibration of the engine block, causing an error in detection of the internal pressure in the engine cylinder and fluctuation of engine revolution.

SUMMARY OF THE INVENTION

Therefore, it is an object of the present invention to provide a system for monitoring combustioning condition of an internal combustion engine which can perform monitoring of the engine combustioning condition without utilizing a pressure sensor.

Another object of the invention is to provide an engine combustioning condition monitoring system which monitors a combustioning condition on the basis of variations of velocity of crankshaft angular displacement.

In order to accomplish the aforementioned and other objects, an engine combustioning condition monitoring system, according to the present invention, monitors crankshaft angular position for detecting an engine cylinder in a combustion cycle. The system derives variation of velocity of a crankshaft revolution on the basis of the monitored crankshaft angular positions and derives a combustioning coefficient for each engine cylinder. A value representative of variations of the crankshaft revolution velocity is modified by the combustioning coefficient for deriving internal pressure in each engine cylinder. Discrimination of the engine combustioning condition is made on the basis of the engine cylinder internal pressure.

According to one aspect of the invention, a system for monitoring combustioning condition of an internal combustion engine, comprises:

first means for monitoring an engine operational cycle position from time to time for producing an engine cycle position indicative signal second means for receiving the engine cycle position indicative signal for detecting the engine at a predetermined engine cycle position for producing a timing signal third means, responsive to the timing signal, for deriving an engine revolution speed indicative data and based thereon deriving a combustioning condition dependent coefficient for each engine cylinder representative of the degree of the influence of combustioning condition of the corresponding cylinder for the engine revolution speed and fourth means for deriving an engine revolution speed variation on the basis of the engine revolution speed indicative data and fifth means for deriving a data representative of an internal pressure of the corresponding engine cylinder on the basis of the engine revolution speed indicative data and the combustion condition dependent coefficient derived for the corresponding engine cylinder, and detecting the combustioning condition in the corresponding cylinder on the basis of the internal pressure.

According to another aspect of the invention, a system for monitoring combustioning condition of an internal combustion engine having first and second engine cylinders, comprises:

first means for monitoring an engine operational cycle position from time to time for producing an engine cycle position indicative signal second means for receiving the engine cycle position indicative signal for detecting the first engine cylinder at a predetermined engine cycle position for producing a timing signal third means, responsive to the timing signal, for deriving a first engine revolution speed indicative data with respect to the first engine cylinder and based thereon deriving a first combustioning condition dependent coefficient for the first engine cylinder representative of the degree of influence of the combustioning condition of the first engine cylinder for the engine revolution speed fourth means for receiving the engine cycle position indicative signal for detecting the second engine cylinder at a predetermined engine cycle position for producing a timing signal fifth means, responsive to the timing signal, for deriving a second engine revolution speed indicative data with respect to the second engine cylinder and based thereon deriving a second combustioning condition dependent coefficient for the second engine cylinder representative of the degree of influence of the combustioning condition of the second engine cylinder for the engine revolution speed and sixth means for deriving an engine revolution speed variation with respect to each of the first and second engine revolution speed on the basis of the engine revolution speed indicative data and seventh means for deriving a data representative of an internal pressure of respective engine cylinder on the basis of the engine revolution speed indicative data of respective first and second engine cylinders and respective of the first and second combustion condition dependent coefficients derived for the corresponding engine cylinder, and detecting the combustioning condition in respective of the first and second engine cylinders on the basis of the internal pressure.

The first means may monitor a crankshaft angular position for producing the engine cycle indicative signal indicative of the crankshaft angular position. The first means may further detect the crankshaft at a predetermined reference position for producing a crankshaft reference position indicative signal.

The sixth means derives each of the first and second combustioning condition dependent coefficients on the basis of overlapping magnitude of combustion cycles of each of the first and second engine cylinders.

The third means may include a timer means triggered by the timing signal for measuring elapsed time of the crankshaft shaft angular displacement over a given angle from the predetermined angular position for deriving the engine revolution speed.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
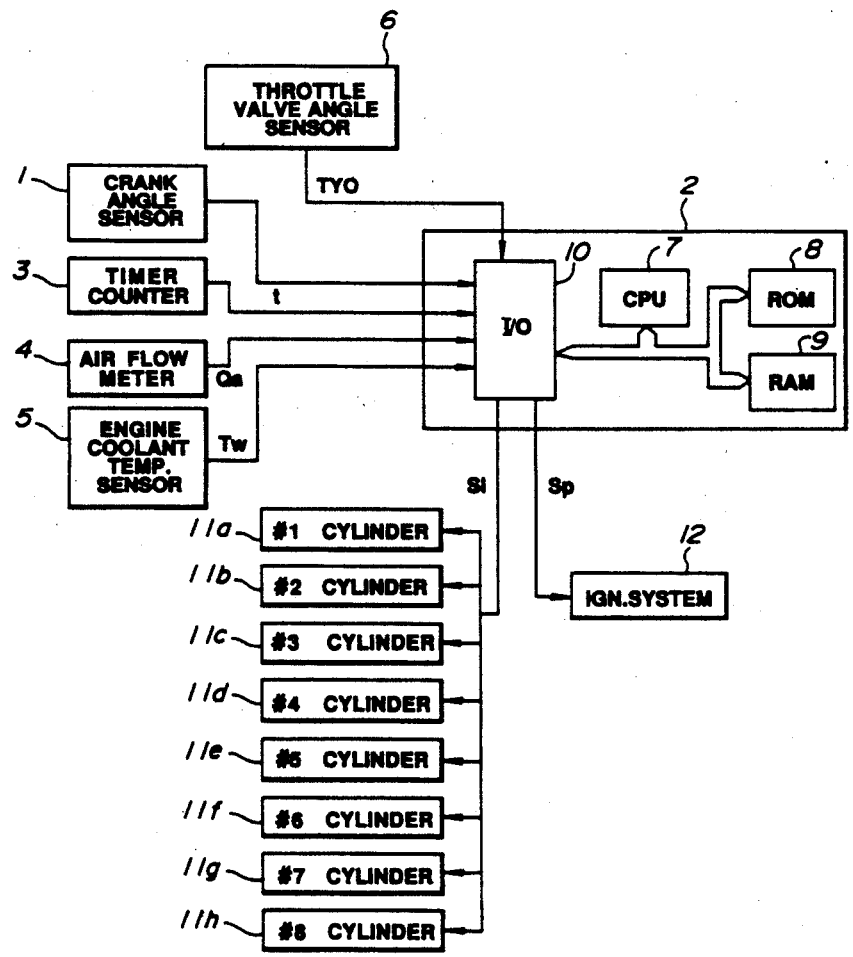
FIG. 1 is a preferred embodiment of an engine combustioning condition monitoring system according to the present invention.

Referring now to the drawings, particularly to FIG. 1, the preferred embodiment of an engine combustioning condition monitoring system, according to the present invention, will be discussed herebelow in terms of an application for an eight-cylinder internal combustion engine. The preferred embodiment of the engine combustioning condition monitoring system includes a crank angle sensor 1 for monitoring crankshaft angular position. The crank angle sensor produces a crank reference signal $\theta_{ref}$ at every predetermined angular position, e.g. 70° before top-dead-center (BTDC), and a crank position signal per every given angle, e.g. 1° of crankshaft angular displacement. The crank angle sensor 1 is per se well known and does not require further detailed discussion about the mechanism of the crank angle sensor. These crank reference signal and the crank position signal are generated in a form of pulse signals. The crank angle sensor 1 is connected to a control unit 2 to input the crank reference signal and the crank position signal.

Figure 2:
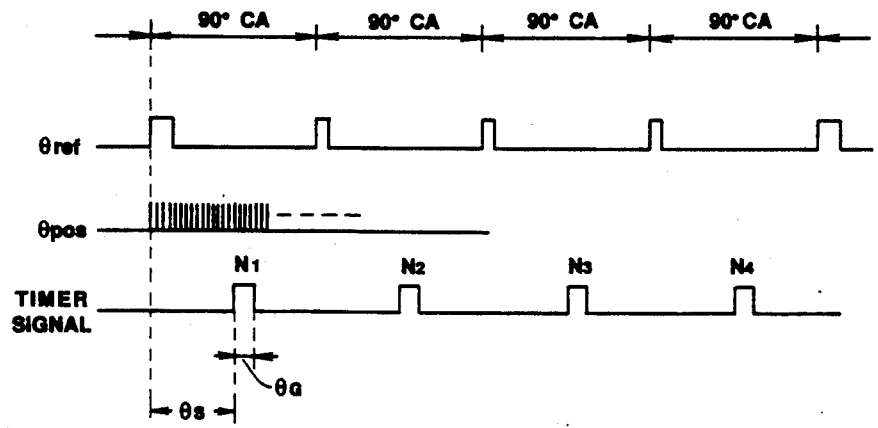
FIG. 2 is a timing chart showing of crank angle signal and a counter timing.

The control unit 2 is also connected to a timer counter 3 which operates at a frequency of 1 MHz. The timer counter 3 is active at a crankshaft angular position of $\theta_s$ from the most recent occurrence of the leading edge of the crank reference signal $\theta_{ref}$ for measuring an elapsed time t in a period, in which the crankshaft causes angular displacement $\theta_G$, as shown in FIG. 2. The angular range $\theta_G$ is set as a substantially smaller angular range in comparison with the interval between top-dead-centers (TDCs). For example, in the shown embodiment, the angular range $\theta_G$ is set at 8°. The data representative of the measured elapsed time t is utilized for deriving the engine revolution speed $N_1$, $N_2$, $N_3$ and $N_4$. As will be appreciated, the engine revolution speed $N_1$, $N_2$, $N_3$ and $N_4$ are determined on the basis of the measured elapsed time and the known angle.

It should be appreciated, that the angular magnitudes $\theta_s$ and $\theta_G$ may be variable by changing setting which is stored in ROM 8 in the control system.

The control unit 2 is further connected to an air flow meter 4 for monitoring an intake air flow rate for producing an intake air flow rate indicative signal Qa, an engine coolant temperature sensor 5 for monitoring the engine coolant temperature to produce an engine coolant temperature signal Tw, and a throttle angle sensor for monitoring a throttle valve and for producing a throttle angle indicative signal TVO. The control unit 2 thus receives various sensor outputs as engine combustioning condition indicative parameter data. The control unit 2 comprises a microprocessor including CPU 7, ROM 8, RAM 9 and input/output (I/O) iport unit 10. CPU 7 of the control unit 2 performs predetermined signal processing process which will be discussed later, for detecting the engine combustioning condition on the basis of the input various engine combustioning condition indicative parameter data.

I/O unit 10 of the control unit 2 is also connected to a spark ignition system 12 and fuel injection valves 11a through 11h for outputting thereto a spark ignition control signal Sp and fuel injection control signals Si. The spark ignition system 12 thus performs spark ignition for respective engine cylinder at a controlled timing defined by the spark ignition control signal. On the other hand, the fuel injection valves 11a through 11h are controlled the valve opening timing and valve open duration on the basis of fuel injection control signal.

It is preferred to form RAM 9 which is adapted to store parameter data to be processed by CPU 7, by a non-volatile memory so that it may hold the parameter data even when the power supply for the control unit 2 is terminated.

The followings are discussions concerning the operation to be performed by the preferred embodiment of the engine combustioning condition monitoring system according to the present invention.

During an engine idling state, the engine revolution in the interval between adjacent TDCs (Top Dead Centers) is influenced by the effective pressure Pi of one of the engine cylinders which is in a combustion and expansion stroke. Therefore, though it is not possible to detect the combustioning condition in the engine from the absolute value of engine revolution speed, it is possible to detect the average effective pressure Pi in one engine cylinder by monitoring revolution speed fluctuations during adjacent TDCs. Here, assuming the pressure within the engine cylinder is P at the crankshaft angular position $\theta°$, the engine driving torque T can be approximated by the following equation:

$$T = \pi \times d^2 \times P \times r \times \sin\theta \quad (1)$$

where
　　d: is a radius of piston and
　　r is radius of crankshaft.

As is well known, the pressure within the engine cylinder varies from time to time with respect to the crankshaft angular position $\theta$. Also, the magnitude and waveform of variation of the internal pressure in the engine cylinder varies according to the combustioning condition of the engine. However, in the shown embodiment, an average pressure P between TDC and the bottom-dead-center (BDC), is taken as approximated pressure representative value for simplification of signal processing. Of course, it is desirable for formulating the process of signal processing in consideration of pressure fluctuations in the engine cylinder. However, even by taking the average pressure as the internal pressure representative data, a practically acceptable precision level in detection of the engine combustioning condition can be obtained.

During crankshaft rotation from an angular position $\theta_1$ to the angular position $\theta_2$, the engine speed fluctuation $\Delta N$ can be illustrated by:

$$\Delta N = \frac{1}{I_p} \int_{\theta_1}^{\theta_2} (T - T_L) d\theta \quad (2)$$

where
　　$T_L$: load torque and
　　$I_p$: an inertia moment

While the idling speed is stable or is not fluctuating, the engine revolution speed fluctuation $\Delta N$ becomes zero (0). Therefore, the following equation can be derived from the foregoing equations (1) and (2):

$$\Delta N = \frac{\pi \times d^2 \times r}{IP} \int_{\theta_1}^{\theta_2} P\sin\theta\, d\theta - \frac{1}{I_p} \int_{\theta_1}^{\theta_2} T_L\, d\theta = 0 \quad (3)$$

Here, assuming that the average pressure P is increased in a magnitude of p, the following equation can be derived from the foregoing equations (1) and (2)

$$\Delta N = \quad (4)$$

$$\frac{\pi \times d^2 \times r}{IP} \int_{\theta_1}^{\theta_2} (P+p)\sin\theta\, d\theta - \frac{1}{I_p} \int_{\theta_1}^{\theta_2} T_L\, d\theta$$

Furthermore, in relation to the equation (3), the engine revolution speed fluctuation can be illustrated by the following equation (5):

$$\Delta N = \frac{\pi \times d^2 \times r}{IP} \int_{\theta_1}^{\theta_2} P\sin\theta\, d\theta \quad (5)$$

$$= k(\cos\theta_1 - \cos\theta_2) \times P$$

where $k = \frac{\pi \times d^2 \times r}{IP}$ : constant

In the conventional four-cylinder engine, the combustioning strokes never overlap in more than one engine cylinder. Therefore, $\theta_1$ is 0° and $\theta_2$ is 180°. From this the foregoing equation (5) can be modified as $$\Delta N = k(\cos 0° - \cos 180°) \times P = k \times 2 \times P$$

As will be appreciated herefrom, the engine revolution speed fluctuation $\Delta N$ becomes linearly corresponds to the average pressure in the engine cylinder. Therefore, by deriving the engine revolution speed fluctuations $\Delta N_1$, $\Delta N_2$, $\Delta N_3$ and $\Delta N_4$ at respective engine strokes, average pressures $P_1$, $P_2$, $P_3$ and $P_4$ of respective engine cylinder can be derived.

Figure 4:
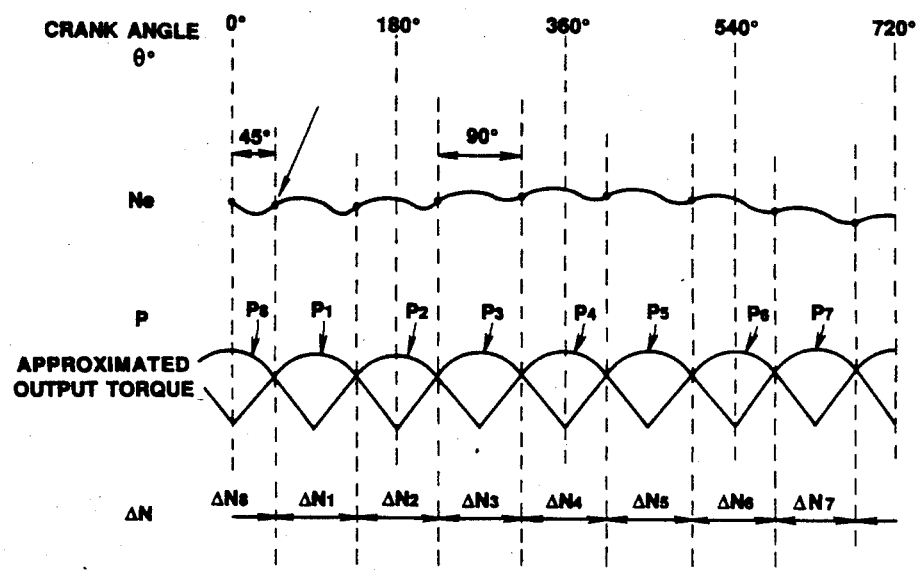
FIG. 4 is a timing chart showing a relationship between an engine revolution speed and an engine driving torque in an eight-cylinder engine.

However, in case of the eight-cylinder engine, the combustion stroke of one engine cylinder always overlaps with the combustion stroke of the adjacent engine cylinder. Therefore, the engine revolution speed fluctuation at any crankshaft angular position is influenced by the adjacent cylinder in the combustion stroke. The magnitude of influence of the adjacent combustioning cylinder can be approximated by the equation (5). For example, as shown in FIG. 4, by setting the engine revolution speed sampling points at angular position 45° after top-dead-center (ATDC) and assuming that the average pressures of respective engine cylinder are $P_1$ through $P_8$ versus the balancing value, the engine revolution speed fluctuation $\Delta N_1$ in No. 1 cylinder can be illustrated by the foregoing formula (5) as follow:

$$\Delta N_1 = k \{(\cos 135° - \cos 180°) \times \quad (7)$$
$$P_8 + (\cos 45° - \cos 135°) \times$$
$$P_1 + (\cos 0° - \cos 45°) \times P_2\}$$
$$= k \times 2 \times (0.147 \times P_8 + 0.707 \times P_1 + 0.147 \times P_2)$$

Namely, for the engine revolution speed fluctuation $\Delta N_1$, influence of the average pressure in the No. 1 cylinder is about 70% and remaining about 30% of influence is given by the average pressures of adjacent No. 8 and No. 2 cylinders. It may be assumed that the proportion of influences given by No. 8 cylinder and No. 2 cylinder is even to each other, i.e. 15% of each. This means, if it is assumed that the engine revolution speed fluctuation $\Delta N$ correspond to the combustioning condition of the corresponding engine cylinder, erroneous detection of degradation of a combustioning condition is caused when mis-firing is caused in the adjacent engine cylinder. Namely, in the shown example, a 15% lower value of the engine revolution speed fluctuation may be monitored when mis-firing is caused in the adjacent cylinder. This problem can be avoided by using the foregoing equation (7) for respective of eight cylinder can be illustrated as follow:

$$2 \times k \begin{bmatrix} a_2 & a_3 & 0 & 0 & 0 & 0 & 0 & a_1 \\ a_1 & a_2 & a_3 & 0 & 0 & 0 & 0 & 0 \\ 0 & a_1 & a_2 & a_3 & 0 & 0 & 0 & 0 \\ 0 & 0 & a_1 & a_2 & a_3 & 0 & 0 & 0 \\ 0 & 0 & 0 & a_1 & a_2 & a_3 & 0 & 0 \\ 0 & 0 & 0 & 0 & a_1 & a_2 & a_3 & 0 \\ 0 & 0 & 0 & 0 & 0 & a_1 & a_2 & a_3 \\ a_3 & 0 & 0 & 0 & 0 & 0 & a_1 & a_2 \end{bmatrix} \times \quad (8)$$

-continued $$\begin{bmatrix} P_1 \\ P_2 \\ P_3 \\ P_4 \\ P_5 \\ P_6 \\ P_7 \\ P_8 \end{bmatrix} = \begin{bmatrix} \Delta N_1 \\ \Delta N_2 \\ \Delta N_3 \\ \Delta N_4 \\ \Delta N_5 \\ \Delta N_6 \\ \Delta N_7 \\ \Delta N_8 \end{bmatrix}$$

where
$a_1 = a_3 = 0.147$
$a_2 = 0.707$

The foregoing equation (8) can be converted to following equation:

$$\frac{1}{2K} \times [D]^{-1} \times \begin{bmatrix} \Delta N_1 \\ \Delta N_2 \\ \Delta N_3 \\ \Delta N_4 \\ \Delta N_5 \\ \Delta N_6 \\ \Delta N_7 \\ \Delta N_8 \end{bmatrix} = \begin{bmatrix} P_1 \\ P_2 \\ P_3 \\ P_4 \\ P_5 \\ P_6 \\ P_7 \\ P_8 \end{bmatrix} \quad (9)$$

where $[D]^{-1}$ is reverse determinant of the determinant of $a_1$, $a_2$ and $a_3$ By solving the foregoing equation (9), the following determinant can be obtained $$\begin{bmatrix} 1.6 & -0.34 & 0.07 & -0.02 & 0.07 & -0.02 & 0.07 & -0.34 \\ -0.34 & 1.6 & -0.34 & 0.07 & -0.02 & 0.07 & -0.02 & 0.07 \\ 0.07 & -0.34 & 1.6 & -0.34 & 0.07 & -0.02 & 0.07 & -0.02 \\ -0.02 & 0.07 & -0.34 & 1.6 & -0.34 & 0.07 & -0.02 & 0.07 \\ 0.07 & -0.02 & 0.07 & -0.34 & 1.6 & -0.34 & 0.07 & -0.02 \\ -0.02 & 0.07 & -0.02 & 0.07 & -0.34 & 1.6 & -0.34 & 0.07 \\ 0.07 & -0.02 & 0.07 & -0.02 & 0.07 & -0.34 & 1.6 & -0.34 \\ -0.34 & 0.07 & -0.02 & 0.07 & -0.02 & 0.07 & -0.34 & 1.6 \end{bmatrix}$$

As can be seen, the determinant is eight row and eight column, the figures in repeating in order. Therefore, in fact, it is necessary to store eight series data for one row in ROM 8.

Assuming the coefficient thus obtained are respective of $d_1, d_2 \ldots d_8$, the foregoing equation (9) can be modified as:

$$\frac{1}{2K} \times (d_1 \times \Delta N_1 + d_2 \times \Delta N_2 + d_3 \times \Delta N_3 + \quad (11)$$
$$d_4 \times \Delta N_4 + d_5 \times \Delta N_5 + d_6 \times \Delta N_6 + d_7 \times \Delta N_7 +$$
$$d_8 \times \Delta N_8) = P_1$$

$$\frac{1}{2K} \times (d_8 \times \Delta N_1 + d_1 \times \Delta N_2 + d_2 \times \Delta N_3 +$$
$$d_3 \times \Delta N_4 + d_4 \times \Delta N_5 + d_5 \times \Delta N_6 + d_6 \times \Delta N_7 +$$
$$d_7 \times \Delta N_8) = P_2$$

where $d_1 = 1.6$, $d_2 = -0.34$, $d_3 = 0.07$, $d_4 = -0.02$, $d_5 = 0.07$, $d_6 = -0.02$, $d_7 = 0.07$ and $d_8 = -0.34$ By utilizing the foregoing equation (11), influences of adjacent cylinders can be avoided.

Figure 5:
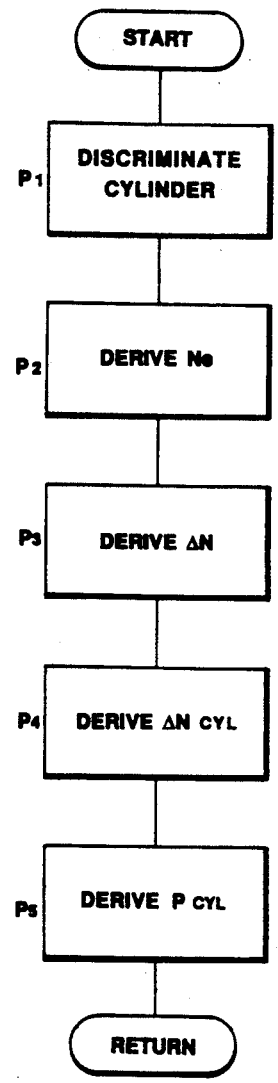
FIG. 5 is a flowchart showing a process of detecting combustioning condition of the engine to be implemented by the preferred embodiment of the engine combustioning condition monitoring system.

FIG. 5 shows a flowchart showing a process of monitoring the combustioning condition in each engine cylinder. The shown routine is periodically or cyclically triggered after expiration of a predetermined time measuring period starting at the crankshaft angular position $\theta_G$.

At a step $S_1$, discrimination is made to ascertain the cylinder number CYL at the combustion TDC. Then, at a step $S_2$, the engine revolution speed Ne is derived on the basis of the measured elapsed time t by the timer counter 3. At the step $S_2$, the engine revolution speed Ne is calculated by the following equation:

$$Ne \text{ (rpm)} = \frac{\theta G \text{ (deg)}}{t \text{ } (\mu s)} \times (60/360) \times 10^6 \quad (12)$$

At a step $S_3$, the engine revolution speed Ne derived in the current execution cycle is compared with that derived in the immediately preceding execution cycle to derive a difference $\Delta N$. Then, at a step $S_4$, $\Delta N_{CYL}$ of each cycle and in each cylinder is derived by the following equation:

$$N_{CYL} = \{(n-1) \times \Delta N_{CLY} + \Delta N_{CYL}\}/n \quad (13)$$

where n: number of data of $\Delta N$

Here, $\Delta N_{CYL}$ is derived by taking average of a predetermined number (n) of the engine revolution speed difference data values. Utilizing the average value may avoid influence of cycle-to-cycle fluctuation in monitoring the combustioning condition in each cylinder.

In the shown embodiment, in order to detect the combustioning condition of one of the engine cylinders, the engine revolution speed difference data $\Delta N_1$ through $-\Delta N_8$ derived with respect to all engine cylinders are used. Here, among eight cylinders, data derived with respect to combustioning timing of two of eight cylinders is differentiated from the remainders in phase. For example, when the on-going process is for deriving the engine revolution speed difference $\Delta N_1$, the elapsed time t of the adjacent engine cylinder is not yet derived in the current revolution cycle, therefore, data for use in derivation of the engine revolution speed difference data as a data representative of the engine revolution speed data is that derived in the immediately preceding execution cycle. Therefore, the derived difference may contain an error caused by cycle-to-cycle fluctuation. According to the shown embodiment, such influence of cycle-to-cycle fluctuation can be avoided by taking the average value over a predetermined number of data derived over preceding predetermined number of execution cycles.

At a step $S_5$, the combustioning condition of the corresponding engine cylinder which is discriminated at the step $S_1$ is derived from the following equation:

$$P_{CYL} = d_1 \times \Delta N_1 + d_2 \times \Delta N_{CYL} \ldots + d_8 \times \Delta N_8 \quad (14)$$

The foregoing equation (14) can be simplified from that in the former equations by removing ($\frac{1}{2}k$). Here, the coefficients $d_1, d_2 \ldots d_8$ thus derived correspond to the values derived utilizing the foregoing equation (11).

Therefore, as will be appreciated, according to the present invention, the combustioning condition in each of the engine cylinders can be precisely monitored by utilizing a coefficient derived in connection with the combustioning condition of the relevant engine cylinder and by correcting the engine revolution speed parameter data.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

Figure 3:
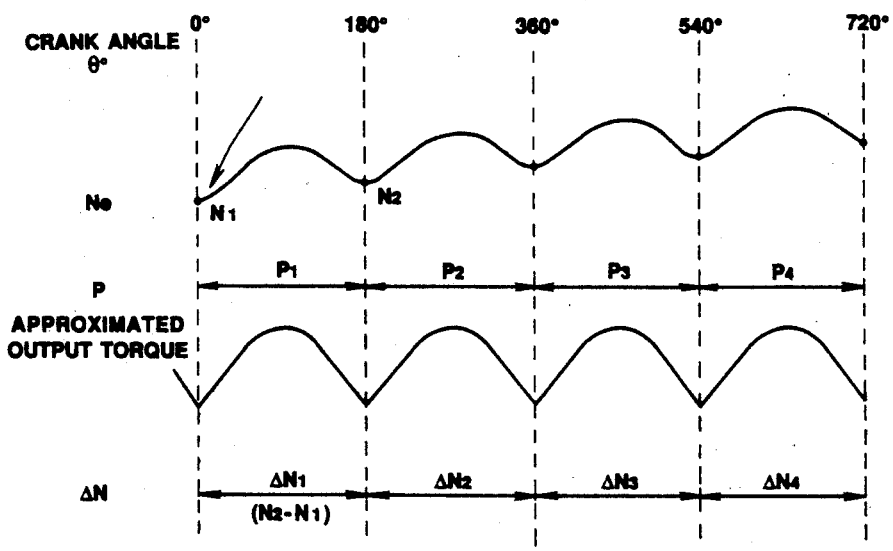
FIG. 3 is a timing chart showing a relationship between an engine revolution speed and an engine driving torque in a four-cylinder engine.
Figure 6:
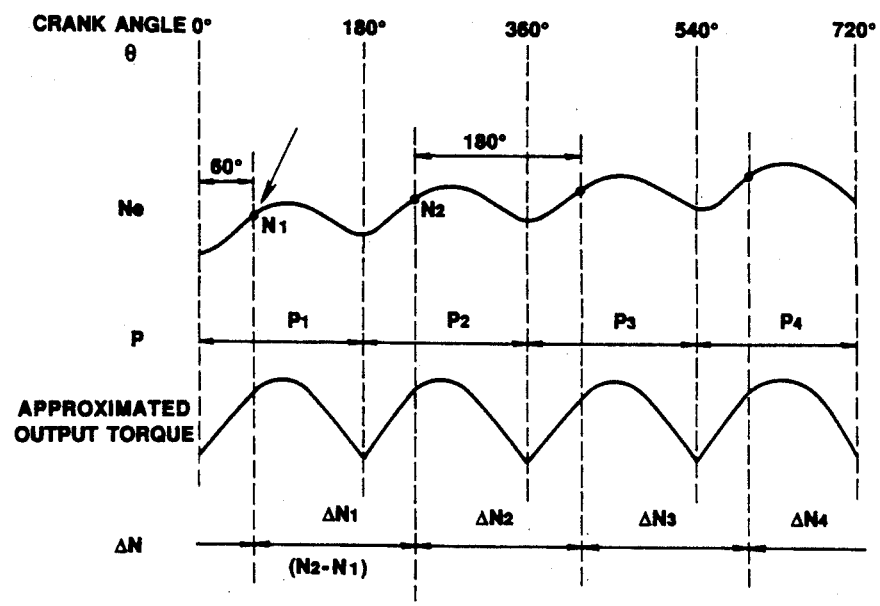
FIG. 6 is a timing chart showing a relationship between an engine revolution speed and an engine driving torque in an eight-cylinder engine, as monitored at modified timing.

The strategy of the present invention as set forth above is applicable not only for an eight-cylinder engine but also for a four-cylinder engine. As will be readily appreciated, it becomes necessary to set the engine revolution speed sampling timing at the TDC of one of the specific engine cylinders so as to avoid influence of the combustioning condition of the adjacent cylinders, as shown in FIG. 3. If the setting of FIG. 3 is modified to that illustrated in FIG. 6 so that the engine revolution speed sampling timing is set at 60° ATDC, the engine revolution speed fluctuation $\Delta N_1$ can be derived by utilizing the following equation which is derived from the foregoing equation (5):

$$\Delta N_1 = k \times ((\cos 60° - \cos 180°) \times P_1 + (\cos 0° - \cos 60°) \times P_2) \quad (15)$$
$$= 2 \times k \times (0.75 P_1 + 0.25 P_2)$$

In this case, the engine revolution speed fluctuation data $\Delta N_1$ contains 25% of influence of the combustioning condition of the adjacent cylinder. Therefore, similarly to that in case of the eight-cylinder engine, the following determinant is established:

$$2 \times k \begin{bmatrix} a_1 & a_2 & 0 & 0 \\ 0 & a_1 & a_2 & 0 \\ 0 & 0 & a_1 & a_2 \\ a_2 & 0 & 0 & a_1 \end{bmatrix} \times \begin{bmatrix} P_1 \\ P_2 \\ P_3 \\ P_4 \end{bmatrix} = \begin{bmatrix} \Delta N_1 \\ \Delta N_2 \\ \Delta N_3 \\ \Delta N_4 \end{bmatrix} \quad (16)$$

where $a_1 = 0.75$, $a_2 = 0.25$ $$(1/2k) \times \begin{bmatrix} d_1 & d_2 & d_3 & d_4 \\ d_4 & d_1 & d_2 & d_3 \\ d_3 & d_4 & d_1 & d_2 \\ d_2 & d_3 & d_4 & d_1 \end{bmatrix} \times \begin{bmatrix} \Delta N_1 \\ \Delta N_2 \\ \Delta N_3 \\ \Delta N_4 \end{bmatrix} = \begin{bmatrix} P_1 \\ P_2 \\ P_3 \\ P_4 \end{bmatrix} \quad (17)$$

where $d_1 = 1.35$, $d_2 = 0.45$, $d_3 = 0.15$, $d_4 = -0.05$
Average pressure $P_1$ is derived from the following equation:

$$P_1 = (\tfrac{1}{2}k)(d_1 \times \Delta N_1 + d_2 \times \Delta N_2 + d_3 \times \Delta N_3 + d_4 \times \Delta N_4) \quad (18)$$

From the above, the combustioning condition can be accurately monitored.

What is claimed is:

1. A system for monitoring a combustioning condition of an internal combustion engine having a plurality of engine cylinders, comprising:

first means for monitoring engine operational cycle positions from time to time and for producing an engine cycle position indicative signal;

second means for receiving said engine cycle position indicative signal and for detecting the engine at a predetermined engine cycle position for producing a timing signal;

third means, responsive to said timing signal, for deriving an engine revolution speed indicative data, and, based thereon, for deriving a combustioning condition dependent coefficient for each engine cylinder in a combustioning cycle, which combustioning condition dependent coefficient represents a degree of influence of the combustioning condition of the engine cylinder on the engine revolution speed;

fourth means for deriving an engine revolution speed variation of each cylinder on the basis of said engine revolution indicative data; and fifth means for deriving a data representative of an internal pressure of each engine cylinder on the basis of said engine revolution speed indicative data and said combustion condition dependent coefficients derived for all engine cylinders, and for detecting the combustioning condition in said cylinder on the basis of said internal pressure.

2. A system as set forth in claim 1; wherein said first means monitors a crankshaft angular position for producing said engine cycle indicative of the crankshaft angular position.

3. A system as set forth in claim 2, wherein said third means includes a timer means triggered by said timing signal for measuring an elapsed time of said crankshaft shaft angular displacement over a given angle from said predetermined angular position for deriving said engine revolution speed.

4. A system as set forth in claim 2, wherein said first means further detects the presence of said crankshaft at a predetermined reference position for producing a crankshaft reference position indicative signal.

5. A system as set forth in claim 1, wherein said third means derives said combustioning condition dependent coefficient on the basis of overlapping magnitudes of combustion cycles of each engine cylinder.

6. A system for monitoring a combustioning condition of an internal combustion engine having first and second engine cylinders, comprising:

first means for monitoring an engine operational cycle position from time to time and for producing an engine cycle position indicative signal;

second means for receiving said engine cycle position indicative signal and for detecting said first engine cylinder at a predetermined engine cycle position for producing a first timing signal;

third means, responsive to said first timing signal, for deriving a first engine revolution speed indicative data with respect to said first engine cylinder and, based thereon, for deriving a first combustioning condition dependent coefficient for said first engine cylinder representative of a degree of influence of the combustioning condition of the first engine cylinder for the engine revolution speed;

said second means being further operable to receive said engine cycle position indicative signal and to detect said second engine cylinder at a predetermined engine cycle position for producing a second timing signal;

said third means being further responsive to said second timing signal, to derive a second engine revolution speed indicative data with respect to said second engine cylinder, and based thereon, to derive a second combustioning condition dependent coefficient for said second engine cylinder representative of a degree of influence of the combustioning condition of the second engine cylinder for the engine revolution speed;

fourth means for deriving an engine revolution speed variation with respect to each of said first and second engine revolution speeds on the basis of said engine revolution speed indicative data; and fifth means for deriving data representative of an internal pressure of each of the respective engine cylinders on the basis of said engine revolution speed indicative data of the respective first and second engine cylinders and on the basis of both of said first and second combustion condition dependent coefficients derived from the corresponding engine cylinders, and for detecting the combustioning condition in the respective first and second engine cylinders on the basis of said internal pressure.

7. A system as set forth in claim 6, wherein said first means monitors a crankshaft angular position for producing said engine cycle indicative signal indicative of the crankshaft angular position.

8. A system as set forth in claim 7, wherein said third means includes a timer means triggered by said first and second timing signals for measuring an elapsed time of said crankshaft shaft angular displacement over a given angle from said predetermined angular position for deriving said engine revolution speed.

9. A system as set forth in claim 7, wherein said first means further detects the presence of said crankshaft at a predetermined reference position for producing a crankshaft reference position indicative signal.

10. A system as set forth in claim 6, wherein said third means derives each of said first and second combustioning condition dependent coefficients on the basis of overlapping magnitudes of combustion cycles of each of said first and second engine cylinders.

* * * * *